(12) United States Patent
Hakola et al.

(10) Patent No.: US 9,258,831 B2
(45) Date of Patent: Feb. 9, 2016

(54) APPARATUS AND METHOD FOR USE IN A COMMUNICATION SYSTEM

(71) Applicant: Broadcom Corporation, Irvine, CA (US)

(72) Inventors: Sami-Jukka Hakola, Kempele (FI); Samuli Turtinen, Li (FI); Timo Kalevi Koskela, Oulu (FI)

(73) Assignee: BROADCOM CORPORATION, Irvine, CA (US)

( * ) Notice: Subject to any disclaimer, the term of this patent is extended or adjusted under 35 U.S.C. 154(b) by 95 days.

(21) Appl. No.: 14/049,619

(22) Filed: Oct. 9, 2013

(65) Prior Publication Data

US 2014/0098763 A1    Apr. 10, 2014

(30) Foreign Application Priority Data

Oct. 10, 2012   (GB) .................................. 1218202.8

(51) Int. Cl.
*H04W 74/08*  (2009.01)
*H04W 72/04*  (2009.01)
*H04W 36/00*  (2009.01)
*H04W 72/08*  (2009.01)
*H04W 74/04*  (2009.01)

(52) U.S. Cl.
CPC ...... *H04W 74/0833* (2013.01); *H04W 72/0466* (2013.01); *H04W 36/0077* (2013.01); *H04W 36/0094* (2013.01); *H04W 72/0426* (2013.01); *H04W 72/082* (2013.01); *H04W 74/04* (2013.01)

(58) Field of Classification Search
None
See application file for complete search history.

(56) References Cited

U.S. PATENT DOCUMENTS

2011/0007690 A1   1/2011  Chang et al.
2012/0071200 A1   3/2012  Bienas et al.
2014/0328309 A1*  11/2014  Comstock ..................... 370/329

FOREIGN PATENT DOCUMENTS

EP           2 309 817 A1    4/2011

OTHER PUBLICATIONS

UKIPO Combined Search and Examination Report under Sections 17 and 18(3) dated Feb. 11, 2013 which is issued in a related UK Application No. GB1218202.8 (5 page).
3GPP TS 36.321 v10.5.0 Technical Specification, $3^{rd}$ Generation Partnership Project; Technical Specification Group Radio Access Network; Evolved Universal Terrestrial Radio Access (E-UTRA); Medium Access Control MAC) protocol specification (Release 10); Mar. 2010 (54 pages).
3GPP TS 36.300 v11.1.0 Technical Specification, $3^{rd}$ Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2 (Release 11); Mar. 2010 (194 pages).

* cited by examiner

*Primary Examiner* — Vincelas Louis
(74) *Attorney, Agent, or Firm* — Foley & Lardner LLP; Joseph N. Ziebert; Angela D. Murch

(57) ABSTRACT

Apparatuses and method for communication includes controlling one or more local area base stations and allocating resources of a common random access channel between the local area base stations, the resources including preambles and informing the local area base stations and user equipment within a given area about the allocation.

18 Claims, 6 Drawing Sheets

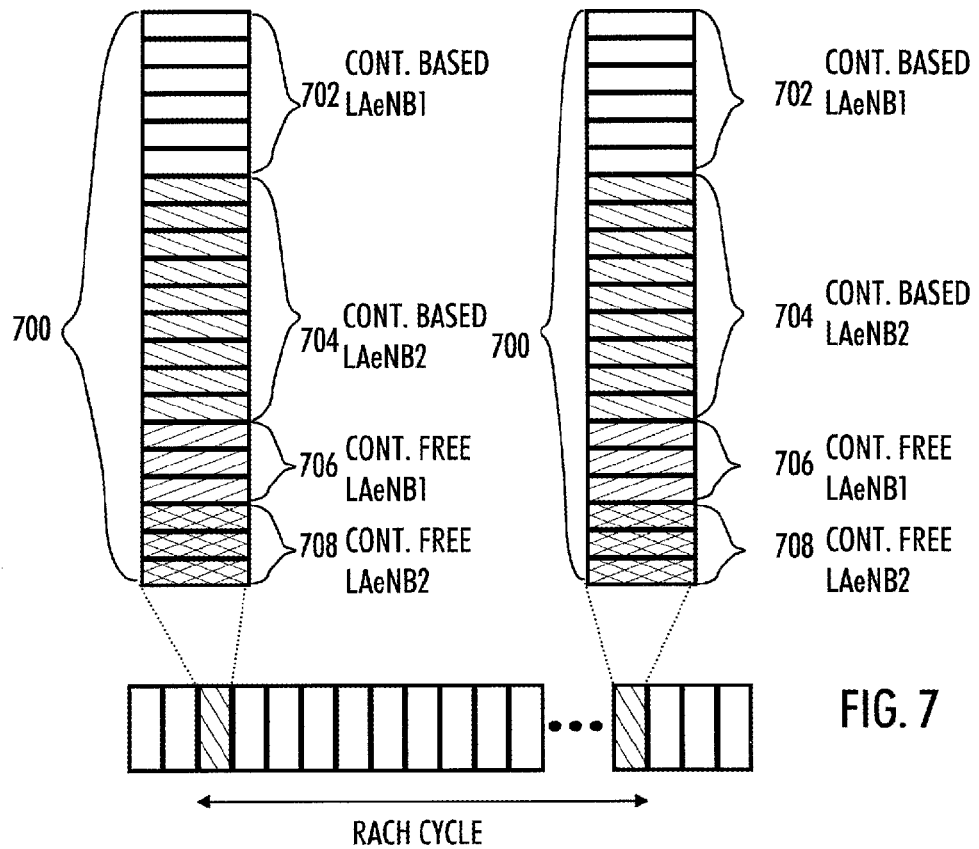
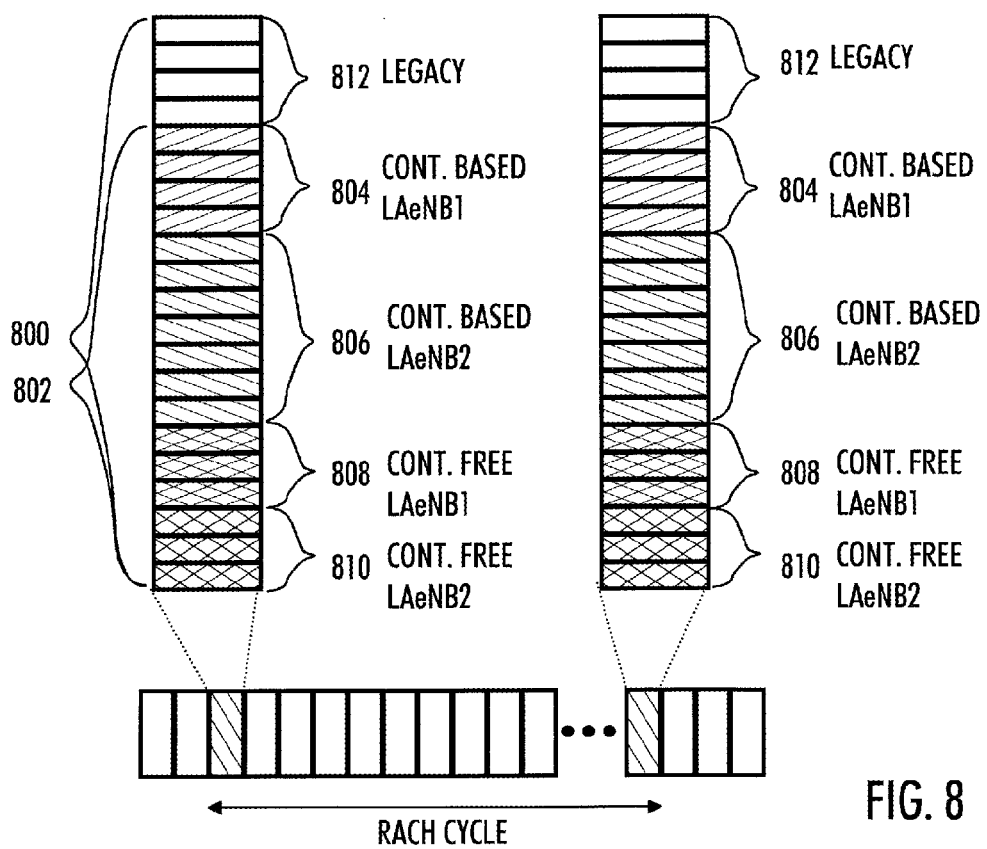

APPARATUS AND METHOD FOR USE IN A COMMUNICATION SYSTEM

CROSS REFERENCE TO RELATED APPLICATION

This application claims the benefit under 35 U.S.C. §119 (a) and 37 CFR §1.55 to UK Patent Application No. 1218202.8, filed on Oct. 10, 2012, the entire content of which is incorporated herein by reference.

TECHNICAL FIELD

The present invention relates to an apparatus and method for use in a Communication System, in particular, but not exclusively, a wireless communication system. Embodiments of the invention relate especially to cell access in communication networks.

BACKGROUND

Wireless communication systems are constantly under development. Developing systems provide a cost-effective support of high data rates and efficient resource utilization. One communication system under development is the 3rd Generation Partnership Project (3GPP) Long Term Evolution (LTE). An improved version of the Long Term Evolution radio access system is called LTE-Advanced (LTE-A). The LTE is designed to support various services, such as high-speed data, multimedia unicast and multimedia broadcast services.

One aspect under development is the concept of small cells. It has been proposed that under a macro cell serving a large area there would be a number of smaller cells with local area coverage. The small cells could reduce the power consumption at both base stations and user equipment side, offload traffic from the macro cell, and also potentially enable some new service types in the future.

It has been proposed that the small cells may be similar to Remote Radio Heads (RRH) which operate as individual cells but some of the processing, such as the baseband processing, may be done in a central entity. On the other hand, the small cell nodes may be more independent of the macro node. Thus, all the processing may be done in the small cell nodes but a specified interface may be deployed between a macro node and a small cell node.

SUMMARY

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to a more detailed description that is presented later.

According to an aspect of the present invention, there is provided an apparatus for use in a communication system, the apparatus including a processing system configured to: control one or more local area base stations; and allocate resources of a common random access channel between the local area base stations, the resources including preambles.

According to an aspect of the present invention, there is provided an apparatus for use in a communication system, the apparatus including a processing system configured to: receive information on resources of a common random access channel allocated to the apparatus, the resources including a subset of the preambles of the common random access channel, the preambles being divided between other respective apparatuses, and utilise the allocated resources.

According to an aspect of the present invention, there is provided an apparatus for use in user equipment, the apparatus including a processing system configured to: control the reception of information on resources of a common random access channel allocated to one or more local area base stations, the resources allocated to each local area base station including a subset of preambles of the common random access channel, and utilise the resources when controlling the transmission of a random access preamble.

According to another aspect of the present invention, there is provided a method in a communication system, the method including: controlling one or more local area base stations; allocating resources of a common random access channel between the local area base stations, the resources including preambles.

According to another aspect of the present invention, there is provided a method in a communication system, the method including: receiving information on resources of a common random access channel allocated to the apparatus, the resources including a subset of the preambles of the common random access channel, the preambles being divided between other respective apparatuses, and utilising the allocated resources.

According to another aspect of the present invention, there is provided a method in a communication system, the method including: controlling the reception of information on resources of a common random access channel allocated to one or more local area base stations, the resources allocated to each local area base station including a subset of preambles of the common random access channel, and utilising the resources when controlling the transmission of a random access preamble.

Further features and advantages of the invention will become apparent from the following description of preferred embodiments of the invention, given by way of example only, which is made with reference to the accompanying drawings.

BRIEF DESCRIPTION OF THE DRAWINGS

FIGS. 3, 4, 5, 6, 7 and 8 show examples of random access channel preamble allocations and configurations.

DETAILED DESCRIPTION

Some embodiments of the present invention are applicable to user equipment (UE), a base station, eNodeB, a corresponding component, and/or to any communication system or any combination of different communication systems that support the required functionality.

The protocols used, the specifications of communication systems, servers and user terminals, especially in wireless communication, develop rapidly. Such development may require extra changes to an embodiment. Therefore, all words and expressions should be interpreted broadly and they are intended to illustrate, not to restrict, embodiments.

Many different radio protocols for use in communications systems exist. Some examples of different communication systems are the universal mobile telecommunications system (UMTS) radio access network (UTRAN), HSPA (High Speed Packet Access), long term evolution (LTE)®, known also as evolved UMTS Terrestrial Radio Access Network E-UTRAN), long term evolution advanced (LTE-A), Wireless Local Area Network (WLAN) based on IEEE 802.11 standard, worldwide interoperability for microwave access (WiMAX®), Bluetooth®, personal communications services (PCS) and systems using ultra-wideband (UWB) technology. IEEE refers to the Institute of Electrical and Electronics Engineers. For example, LTE® and LTE-A are developed by the Third Generation Partnership Project 3GPP.

Figure 1:
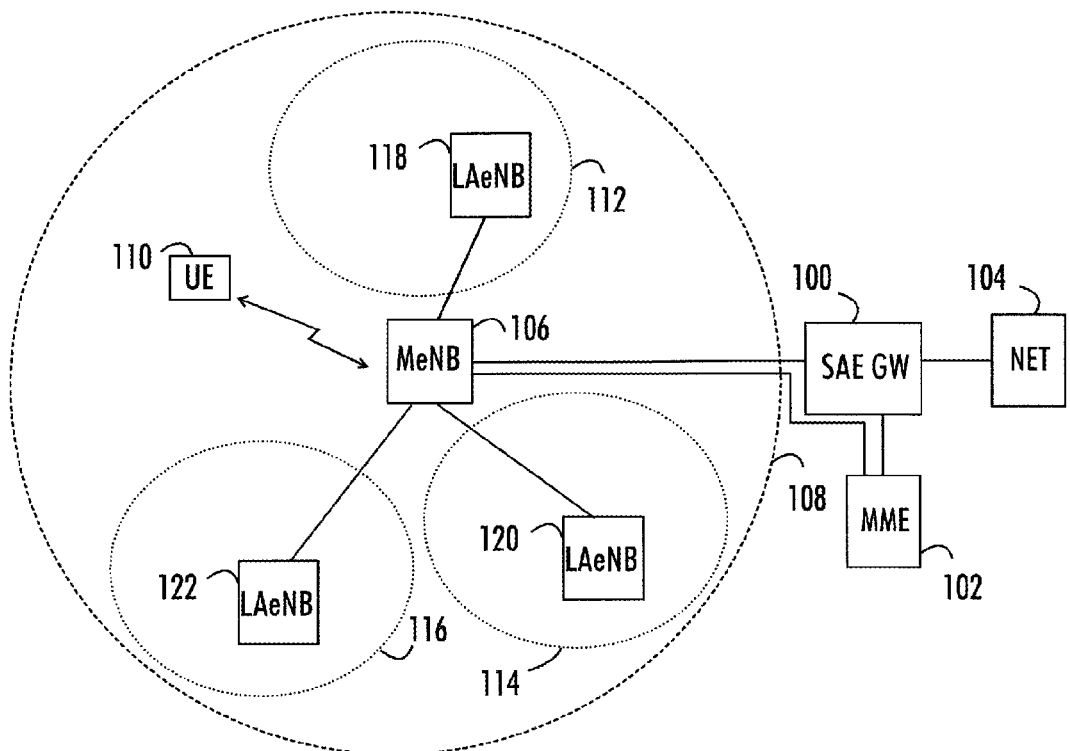
FIG. 1 shows an example of a communication environment.

FIG. 1 illustrates a simplified view of a communication environment only showing some elements and functional entities, all being logical units whose implementation may differ from what is shown. The connections shown in FIG. 1 are logical connections; the actual physical connections may be different. It is apparent to a person skilled in the art that the systems also include other functions and structures. It should be appreciated that the functions, structures, elements and the protocols used in or for communication are irrelevant to the actual invention. Therefore, they need not to be discussed in more detail here.

In the example of FIG. 1, a radio system based on LTE/SAE (Long Term Evolution/System Architecture Evolution) network elements is shown. However, the embodiments described in these examples are not limited to the LTE/SAE radio systems but can also be implemented in other radio systems.

The simplified example of a network of FIG. 1 includes a SAE Gateway (GW) 100 and an MME 102. The SAE Gateway 100 provides a connection to Internet (NET) 104. FIG. 1 shows a base station or an eNodeB 106 serving a cell 108. In this example, the eNodeB 106 is connected to the SAE Gateway 100 and the MME 102.

In this example, the cell 108 is a macro cell and the eNodeB 106 is a macro cell node. The macro node 106 may be denoted as Macro eNodeB (MeNB).

In general, the eNodeBs (Enhanced node Bs) of a communication system may host the functions for Radio Resource Management: Radio Bearer Control, Radio Admission Control, Connection Mobility Control, Dynamic Resource Allocation (scheduling). The MME 102 (Mobility Management Entity) is responsible for the overall UE control in mobility, session/call and state management with assistance of the eNodeBs through which the UEs connect to the network. The SAE GW 100 is an entity configured to act as a gateway between the network and other parts of communication network such as the Internet for example. The SAE GW may be a combination of two gateways, a serving gateway (S-GW) and a packet data network gateway (P-GW).

The eNodeB 106 may provide radio coverage to a cell 108. The cell 108 may be of any size or form, depending on the antenna system utilized. The eNodeB 106 may control a cellular radio communication link established between the eNodeB 106 and terminal devices or user equipment (UE) 110 located within the cell 108. The terminal device may be a user equipment of a cellular communication system, e.g. a personal computer (PC), a laptop, a hand held computer, a tablet, a mobile phone, or any other user terminal or user equipment capable of communicating with the cellular communication network.

In the example of FIG. 1, there are three small cells 112, 114, 116 installed within the macro cell. Each small cell is served by a node, 118, 120 and 122. The nodes 118, 120, 122 serving small cells may be denoted as local area base stations or eNodeBs (LAeNB).

In an embodiment, the small cells operate on a separate frequency layer which is dedicated for small cell deployment. The operation in small cell frequency layer may be controlled by the overlaying macro cell that provides the coverage in another frequency layer over coverage area of the small cells. The control relationship between macro and small cell layer may vary depending on the selected architecture. In an embodiment, the macro layer may provide common control information for the UEs operating in small cell layer.

In an embodiment, the small cells 112, 114, 116 are intended to be deployed in an energy efficient manner, especially during time instants when there are no UEs connected to them. Thus, the amount of traffic the small cells transmit when they are in this "idle" mode should be minimized. The traffic may include discovery/beacon signal transmissions and listening to the UEs' attach requests, for example.

In an embodiment, the macro node may distribute information about the small cell discovery signals and attach parameters, for example. When the amount of small cells within the area of a macro cell increases also the amount of signaling overhead from the macro node may increase. In an embodiment, a common random access (RA) mechanism for small cells operating under given macro node may be utilized to reduce amount of parameters to be signaled from the macro node when configuration is distributed to the UE devices. The Random Access Channel (RACH) is an uplink transmission used by the UE to initiate synchronization with the eNodeB. Current LTE random access channel RACH includes 64 preambles to separate UEs camping on the cell simultaneously. For a small cell scenario the lower amount of preambles at one time occasion may be sufficient as the amount of UEs per a small cell is low.

Figure 2A:
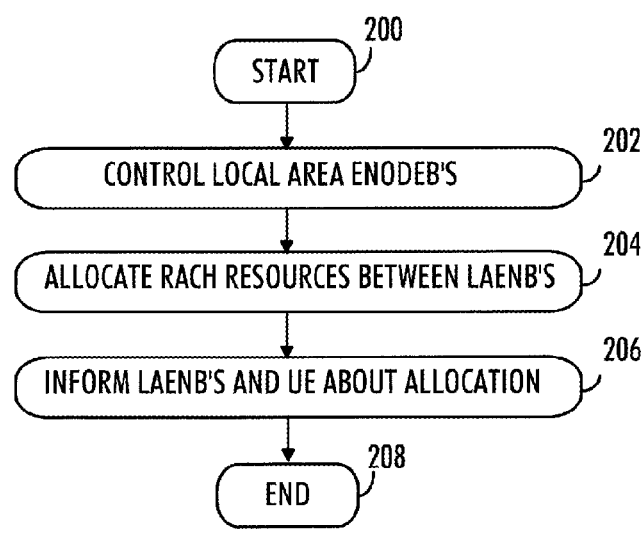
FIGS. 2A, 2B and 2C are flowcharts illustrating some example embodiments of the invention.

FIG. 2A is a flowchart illustrating an example embodiment of the invention. The apparatus employing the embodiment may be a base station or an eNodeB of a communication system serving a macro cell or a part of such an eNodeB, for example.

The process starts at step 200.

In step 202, the apparatus is configured to control one or more local area base stations. The control may be realized as the MeNB being responsible for providing common control information regarding the LAeNBs for the UEs operating in the small cell layer.

In step 204, the apparatus is configured to allocate resources of a random access channel between the local area base stations, the resources including preambles.

In an embodiment, the MeNB configures a common RACH for the LAeNBs under its control by selecting common parameters for RACH like time/frequency resource, periodicity, root sequence, and maximum amount of preamble transmissions. Examples of allocation and configurations are presented below in connection with FIGS. 3 to 8.

In an embodiment, the apparatus is configured to inform the LAeNBs and the UEs within its area about the allocation in step 206. Thus each UE receives one random access channel configuration from MeNB that covers multiple LAeNBs.

The process ends in step 208.

Figure 2B:
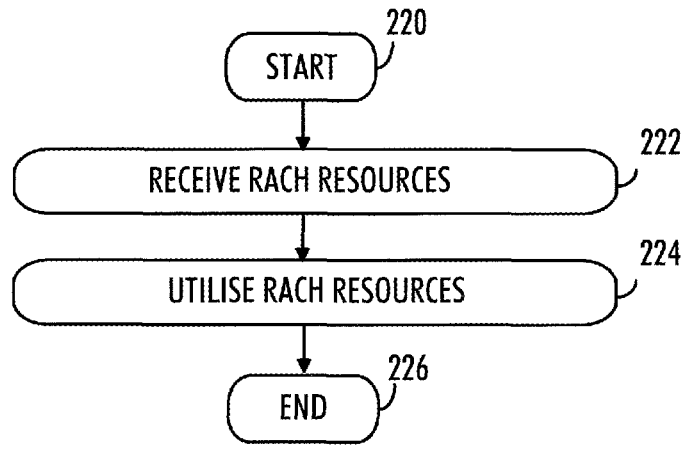

FIG. 2B is a flowchart illustrating an example embodiment of the invention. The apparatus employing the embodiment may be a local area base station or an eNodeB of a communication system serving a small cell or a part of such an eNodeB, for example. The process starts at step 220.

In step 222, the apparatus is configured to receive information on resources of a random access channel allocated to the apparatus. The resources may include a subset of the preambles of a random access channel, the preambles being divided between other corresponding apparatuses. Thus, each corresponding apparatus, such as a LAeNB, has been allocated different preambles of a single RACH, for example.

In an embodiment, the information may be received via an interface between MeNB and LAeNB (e.g. X2 interface).

In step 224, the apparatus is configured to utilise the allocated resources. The apparatus may be configured to listen to the allocated resources for UE transmissions. For example, when the apparatus detects UE transmission on the RACH with a preamble which has been allocated to it, it is aware that the transmitting UE desires to connect to it and not to other apparatuses possibly serving nearby.

The process ends in step 226.

Figure 2C:
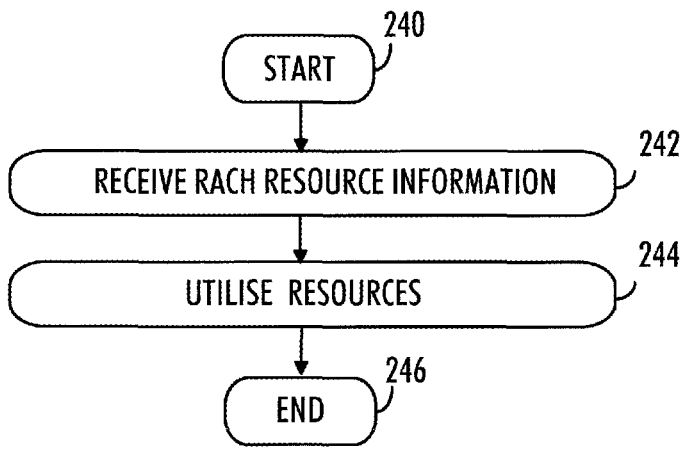

FIG. 2C is a flowchart illustrating an example embodiment of the invention. The apparatus employing the embodiment may be user equipment of a communication system located in a small cell or a part of user equipment, for example. The process starts at step 240.

In step 242, the apparatus is configured to control the reception of information on resources of a random access channel allocated to one or more local area base stations, the resources allocated to each local area base station including a subset of preambles of the random access channel.

In an embodiment, the information is received as a part of dedicated signalling. In an embodiment, the apparatus is configured control the reception of one or more broadcast messages including the information. In yet another embodiment, the information is received in System Information Block transmissions.

In step 244, the apparatus is configured to utilise the resources when controlling the transmission of random access preambles. On the basis of the received information, the UE is aware of preambles allocated to each local area node. If the UE needs to contact a local area node it uses the preambles allocated to the node.

The process ends in step 246.

In current LTE specifications, the opportunity for UEs to transmit on RACH is periodical. The RACH cycle or time interval may be selected by the network. Factors affecting the cycle may be the expected RACH load and the size of the cell.

In an embodiment, a dedicated preamble group within one RACH is allocated by a MeNB for each LAeNB under its control. The preamble group size may be different for each LAeNB. For example, preamble indexes 0 to 15 of a given RACH may be allocated to LAeNB1 (e.g. LAeNB 118) and preamble indexes 16 to 47 of the same RACH to LAeNB2 (e.g. LAeNB 120). Thus, UE wishing to camp on LAeNB1 would use preamble indexes 0 to 15 in transmission on the given RACH.

Figure 3:
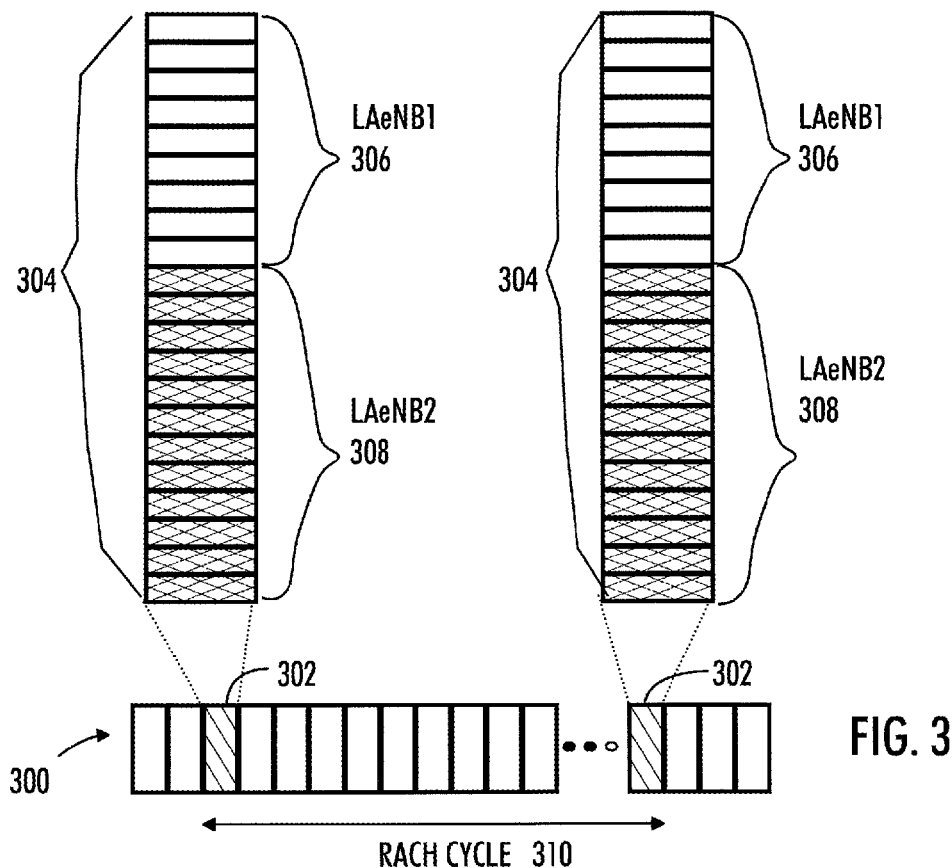

FIG. 3 illustrates the above example. FIG. 3 shows LTE subframe 300 including RACH 302. The RACH includes a set of preambles 304 for the UEs to use. In this example, a given number of preambles 306 are allocated to LAeNB1 and another given number 308 to LAeNB2. The same RACH with the same allocations occurs again after a predetermined RACH cycle or time interval 310.

In an embodiment, the MeNB is configured to divide random access channel occasions in time for different LAeNBs.

Figure 4:
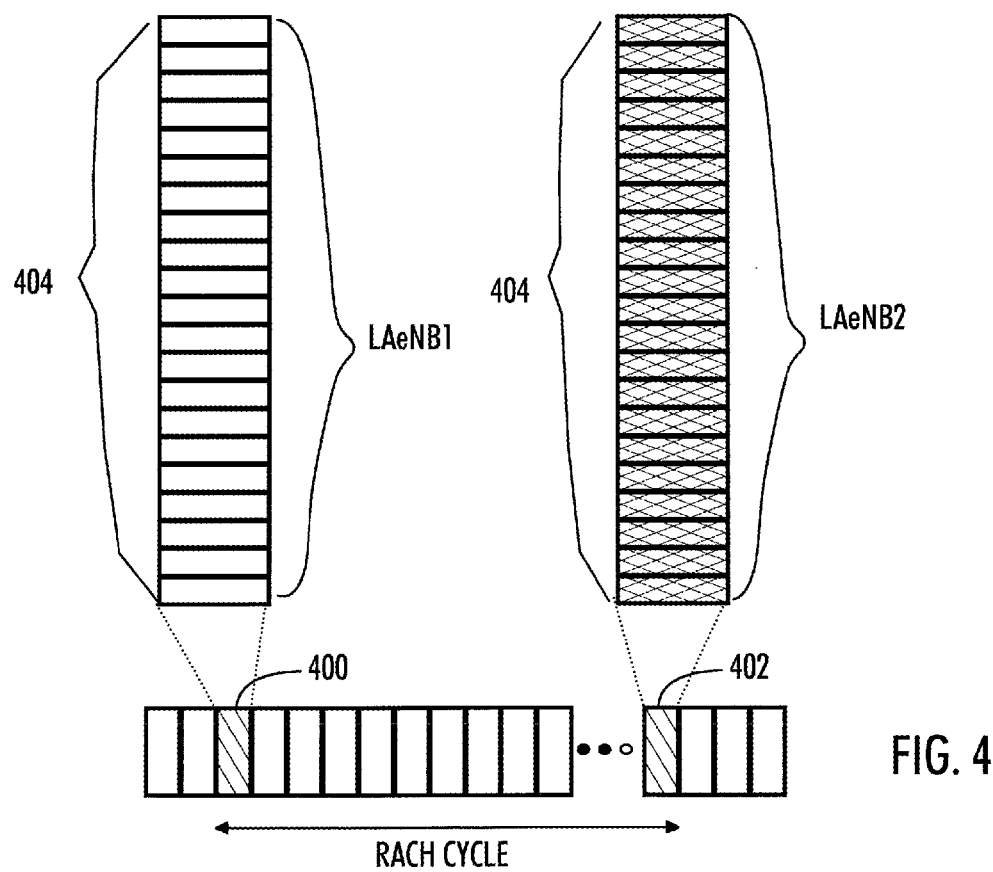

FIG. 4 illustrates this example. Assume here that the RACH occurs at time instants t1, t2, t3, t4, . . . . FIG. 4 shows time instants t1 400 and t2 402. At time instant t1 RACH preambles 404 are allocated to LAeNB1. At time instant t2 the same RACH preambles 404 are allocated to LAeNB2.

In an embodiment, the MeNB is configured to divide random access channel occasions in time for different LAeNB groups, each group including one or more LAeNBs.

Figure 5:
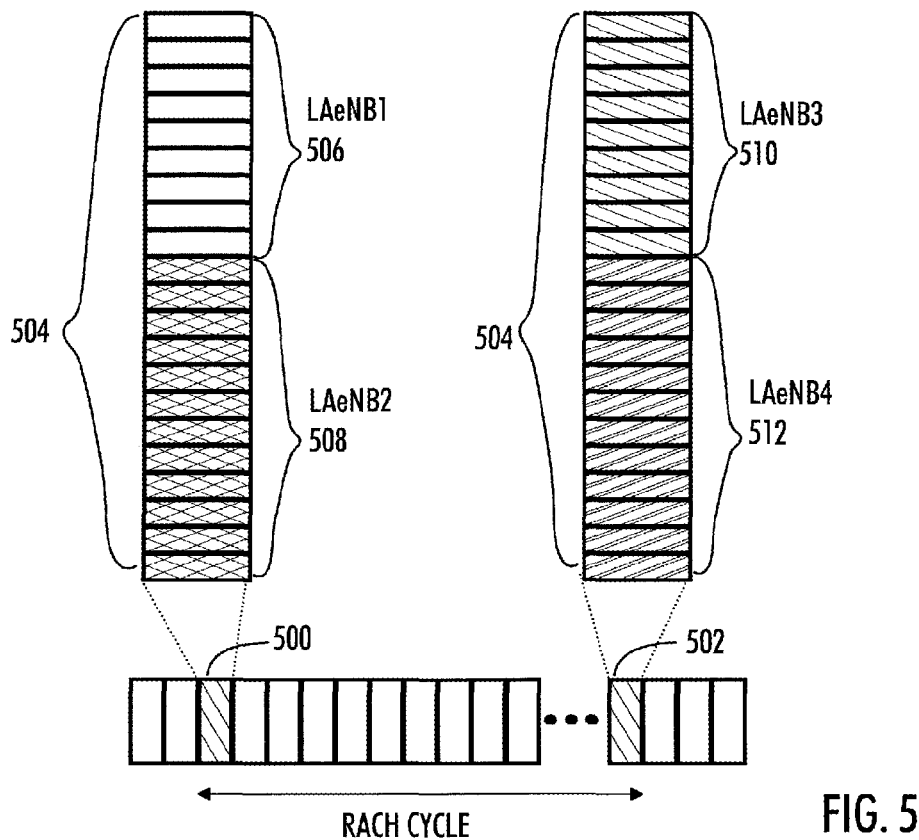

FIG. 5 illustrates this example. Assume here that RACH occurs at time instants t1, t2, t3, t4, . . . . The MeNB has divided the LAeNBs into two groups, LAeNB#1 and LAeNB#2. In this example, LAeNB#1 includes LAeNBs LAeNB1 and LAeNB2. LAeNB#2 includes LAeNBs LAeNB3 and LAeNB4, where each group includes one or more LAeNBs. The MeNB may be configured to allocate RACHs of time instants t1, t3, . . . to LAeNB#1 and RACHs of time instants t2, t4, . . . to LAeNB#2.

FIG. 5 shows time instants t1 500 and t2 502. At time instant t1 RACH preambles 504 are divided between LAeNBs of group LAeNB#1. The preambles 506 are allocated to LAeNB1 and preambles 508 are allocated to LAeNB2. At time instant t2 RACH preambles 504 are divided between LAeNBs of group LAeNB#2. The preambles 510 are allocated to LAeNB3 and preambles 512 are allocated to LAeNB4.

In an embodiment, the MeNB is configured to allocate a predetermined amount of contention free RA preambles for each LAeNB for handover purposes etc. The MeNB may indicate the amount of contention free RA preambles with one parameter value, for example.

Figure 6:
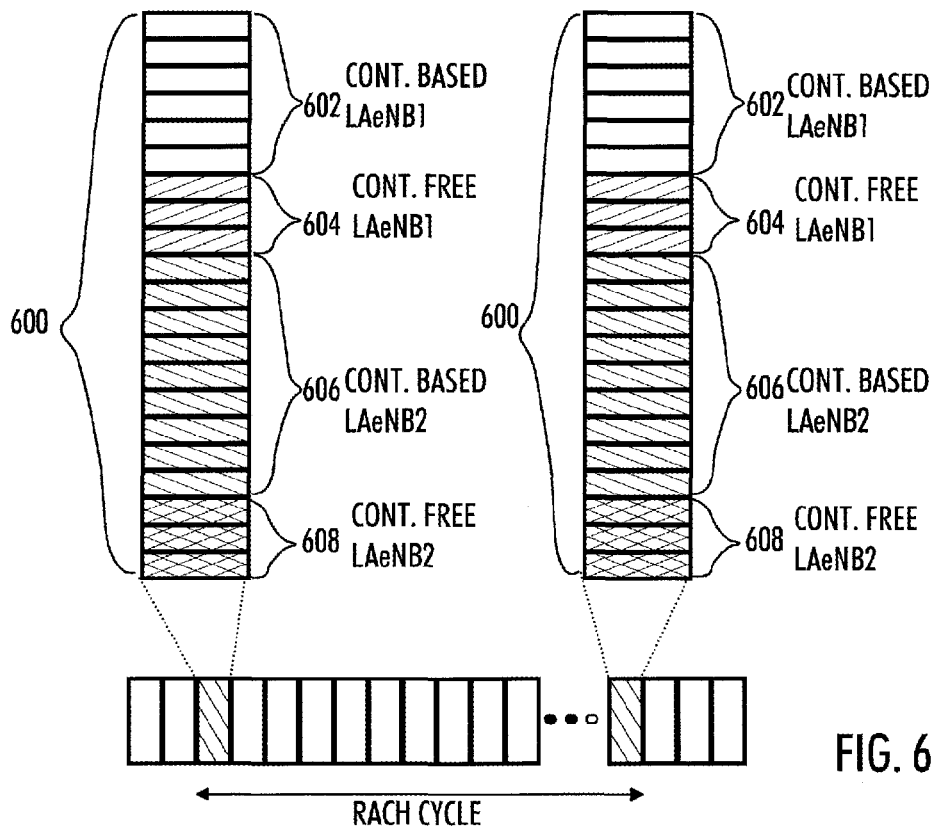

For example, the contention free RA preamble indexes for a given LAeNB may be allocated after the contention based RA preamble indexes of the given LAeNB. FIG. 6 illustrates this example. The RACH includes preambles 600. The preambles 600 are allocated in this example such that first are contention based preambles 602 of LAeNB1, then contention free preambles 604 of LAeNB1, contention based preambles 606 of LAeNB2, and finally contention free preambles 608 of LAeNB2. The same order naturally repeats after the RACH cycle.

In an embodiment, the MeNB is configured to allocate the contention free RA preamble indexes for a given LAeNB after the all contention based RA preamble indexes. They may be allocated in the same order as the corresponding contention based RA preamble indexes for the LAeNBs. FIG. 7 illustrates this example. The RACH includes preambles 700. The preambles 700 of the RACH are allocated in this example such that first are contention based preambles 702 of LAeNB1, then contention based preambles 704 of LAeNB2, contention free preambles 706 of LAeNB1, and finally contention free preambles 708 of LAeNB2. The same order naturally repeats after the RACH cycle.

In an embodiment, random access preamble allocations are done in the contention free preamble space of the legacy RACH configuration to ensure backwards compatibility. Here the term legacy denotes a configuration where the solutions described in this application have not been applied.

FIG. 8 illustrates this example. The RACH includes preambles 800. Preambles 802 are legacy contention free and the random access preamble allocations are done in these preambles. In this example the allocations include contention based preambles 804 of LAeNB1, then contention based preambles 806 of LAeNB2, contention free preambles 808 of LAeNB1, and finally contention free preambles 810 of LAeNB2. The Legacy preamble group 812 is located outside the legacy contention free preambles. The same order repeats after each RACH cycle.

In an embodiment, the MeNB controlling LAeNBs is configured to send a Random Access Response (RAR) that corresponds to RACH defined for multiple LAeNBs. The RAR is a response to the UEs utilizing the resources allocated to the LAeNBs. The UEs are configured to determine Random Access Radio Network Temporary Identifier RA-RNTI corresponding to the RACH and wait for the RAR transmission with the correct RA-RNTI on the MeNB control channel. In another embodiment, each LAeNB sends its own RAR as a response to UE RACH transmissions. In an embodiment, the LAeNB may be configured to cause the sending of a Random Access Response that corresponds to the allocated resources of the random access channel.

Figure 9:
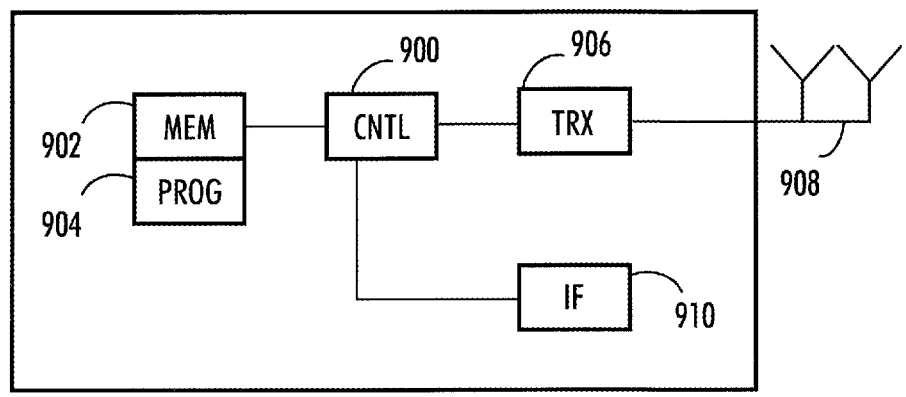
FIGS. 9 and 10 show some examples of apparatuses applying some embodiments of the invention.

FIG. 9 illustrates a simplified example of an apparatus in which some embodiments of the invention may be applied. In some embodiments, the apparatus may be a base station or an eNodeB of a communication system or network. The apparatus may be a part or a section of a base station or an eNodeB.

Figure 10:
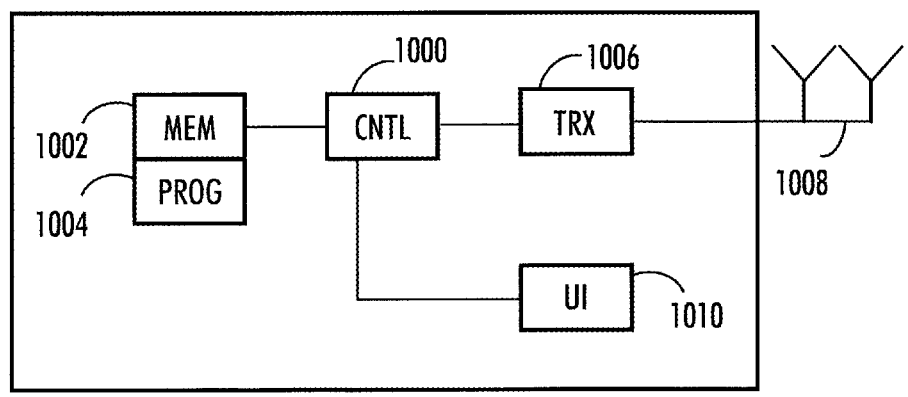

FIG. 10 illustrates a simplified example of an apparatus in which some embodiments of the invention may be applied. In some embodiments, the apparatus may be user equipment UE or a respective apparatus communicating with a base station or an eNodeB of a communications system. The apparatus may be a part or a section of user equipment (e.g. modem).

It should be understood that the apparatuses are depicted herein as examples illustrating some embodiments. It is apparent to a person skilled in the art that the apparatuses may also include other functions and/or structures and not all described functions and structures are required. Although the apparatuses have been depicted as single entities, different modules and memory may be implemented in one or more physical or logical entities. In addition, each apparatus may be a part of another apparatus.

Referring to FIG. 9, the apparatus of the example includes one or more control circuitries or processing circuits (CNTL) 900 configured to control at least part of the operation of the apparatus.

The apparatus may include one or more memories (MEM) 902 for storing data. Furthermore the memory may store software (PROD) 904 executable by the control circuitry 900. The memory may be integrated in the control circuitry.

The apparatus may include a transceiver (TRX) 906. The transceiver is operationally connected to the control circuitry 900. It may be connected to an antenna arrangement 908 including one or more antennas or antenna elements. The apparatus may also include a connection to a transceiver instead of a transceiver.

The apparatus may include an interface (IF) 910. The interface is operationally connected to the control circuitry 900. The apparatus may be connected to network elements of the communication system or network via the interface.

The software 904 may include a computer program including program code means adapted to cause the control circuitry 900 of the apparatus to control a transceiver 906.

If the apparatus is a MeNB or a part of a MeNB, the software 904 may include a computer program including program code means adapted to cause the control circuitry 900 of the apparatus to control one or more local area base stations and allocate resources of a random access channel between the local area base stations, the resources including preambles.

If the apparatus is a LAeNB or a part of a LAeNB, the software 904 may include a computer program including program code means adapted to cause the control circuitry 900 of the apparatus to receive information on resources of a random access channel allocated to the apparatus, the resources including a subset of the preambles of a random access channel, the preambles being divided between other respective apparatuses, and utilise the allocated resources.

FIG. 10 illustrates a simplified example of user equipment UE or a respective apparatus. The apparatus of the example includes one or more control circuitries or processing circuits (CNTL) 1000 configured to control at least part of the operation of the apparatus.

The apparatus may include one or more memories (MEM) 1002 for storing data Furthermore the memory may store software (PROG) 1004 executable by the control circuitry 1000. The memory may be integrated in the control circuitry.

The apparatus may include a transceiver (TRX) 1006. The transceiver is operationally connected to the control circuitry 1000. It may be connected to an antenna arrangement 1008 including one or more antennas or antenna elements. The device may also include a connection to a transceiver instead of a transceiver.

The software 1004 may include a computer program including program code means adapted to cause the control circuitry 1000 of the apparatus to control a transceiver 1006.

The software 1004 may include a computer program including program code means adapted to cause the control circuitry 1000 of the apparatus to control the reception of information on resources of a random access channel allocated to one or more local area base stations, the resources allocated to each local area base station including a subset of preambles of the random access channel, and utilise the resources when controlling the transmission of a random access preamble.

The apparatus may further include user interface (UI) 1010 operationally connected to the control circuitry 1000. The user interface may include a display which may be touch sensitive, a keyboard or keypad, a microphone and a speaker, for example.

The steps and related functions described in the above and attached figures are in no absolute chronological order, and some of the steps may be performed simultaneously or in an order differing from the given one. Other functions can also be executed between the steps or within the steps. Some of the steps can also be left out or replaced with a corresponding step.

The apparatuses or controllers able to perform the above-described steps may be implemented as an electronic digital computer, processing system or a circuitry which may include a working memory (RAM), a central processing unit (CPU), and a system clock. The CPU may include a set of registers, an arithmetic logic unit, and a controller. The processing system, controller or the circuitry is controlled by a sequence of program instructions transferred to the CPU from the RAM. The controller may contain a number of microinstructions for basic operations. The implementation of microinstructions may vary depending on the CPU design. The program instructions may be coded by a programming language, which may be a high-level programming language, such as C, Java, etc., or a low-level programming language, such as a machine language, or an assembler. The electronic digital computer may also have an operating system, which may provide system services to a computer program written with the program instructions.

As used in this application, the term 'circuitry' refers to all of the following: (a) hardware-only circuit implementations, such as implementations in only analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present.

This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

An embodiment provides a computer program embodied on a distribution medium, including program instructions which, when loaded into an electronic apparatus, are configured to control the apparatus to execute the embodiments described above.

The computer program may be in source code form, object code form, or in some intermediate form, and it may be stored in some sort of carrier, which may be any entity or device capable of carrying the program. Such carriers include a record medium, computer memory, read-only memory, and a software distribution package, for example. Depending on the processing power needed, the computer program may be executed in a single electronic digital computer or it may be distributed amongst a number of computers.

The apparatus may also be implemented as one or more integrated circuits, such as application-specific integrated circuits ASIC. Other hardware embodiments are also feasible, such as a circuit built of separate logic components. A hybrid of these different implementations is also feasible. When selecting the method of implementation, a person skilled in the art will consider the requirements set for the size and power consumption of the apparatus, the necessary processing capacity, production costs, and production volumes, for example.

It will be obvious to a person skilled in the art that, as technology advances, the inventive concept can be implemented in various ways. The invention and its embodiments are not limited to the examples described above but may vary within the scope of the claims.

The above embodiments are to be understood as illustrative examples of the invention. Further embodiments of the invention are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. An apparatus for use in a communication system, the apparatus comprising a processing system configured to:
   control a plurality of local area base stations;
   divide occasions in time of a common random access channel for different local area base station groups, such that each occasion in time is allocated to two or more of the local area base station groups, and wherein each local area base station group comprises one or more local area base stations; and
   allocate resources of the common random access channel between the local area base stations, the resources comprising preambles, wherein allocating the resources includes, for said each occasion in time, allocating a preamble group for each local area base station in the local area base station groups to which the occasion in time is allocated;
   wherein each preamble group comprises a predetermined number of contention free preambles and contention based preambles; and
   wherein the apparatus is a macro base station.

2. The apparatus of claim 1, wherein at least one of:
   indexes of the contention free random access preambles for a given local area base station are located after the contention based random access preamble indexes of the given local area base station;
   indexes of the contention free random access preambles at the occasion in time are located after the contention based random access preambles at the occasion in time; or
   the indexes of the contention free random access preambles at the occasion in time are allocated in the same order as the indexes of the corresponding contention based random access preambles at the occasion in time.

3. The apparatus of claim 1, the processing system being further configured to at least one of:
   inform user equipment about the allocation using dedicated signaling;
   inform user equipment about the allocation using one or more broadcast messages; or
   inform user equipment about the allocation using System Information Block transmissions.

4. The apparatus of claim 1, wherein at least one of:
   the processing system being further configured to inform user equipment about an amount of contention free random access preambles with one parameter value; or
   the contention free random access preambles are located in a contention free preamble space of legacy user equipment.

5. The apparatus of claim 1, the processing system being further configured to at least one of:
   cause the sending of a Random Access Response that corresponds to the random access channel; or
   cause one random access channel configuration that covers more than one local area base station to be sent to user equipment.

6. The apparatus of claim 1, wherein the apparatus is in a Long Term Evolution or Long Term Evolution Advanced based communication system.

7. An apparatus for use in a communication system, the apparatus comprising a processing system configured to:
   receive information on resources of a common random access channel allocated to the apparatus, the resources comprising preambles of the common random access channel at an occasion in time, wherein the preambles at the occasion in time are allocated between at least two preamble groups and the apparatus is associated with one of the at least two preamble groups, wherein the preamble group to which the apparatus is associated comprises a predetermined number of contention free preambles and contention based preambles, and
   assign the allocated resources;
   wherein the apparatus is a local area base station.

8. The apparatus of claim 7, wherein at least one of:
   indexes of the contention free random access preambles are located after contention based random access preamble indexes of the apparatus;
   the contention free random access preambles at the occasion in time are located after the contention based random access preambles at the occasion in time; or
   the indexes of the contention free random access preambles at the occasion in time are allocated in the same order as the indexes of the corresponding contention based random access preambles at the occasion in time.

9. The apparatus of claim 7, the processing system being further configured to at least one of:
   receive random access messages from user equipment utilizing the allocated resources;

cause the sending of a Random Access Response that corresponds to the allocated resources of the random access channel; or receive one random access channel configuration that covers more than one local area base station.

10. The apparatus of claim 7, wherein
the apparatus is in a Long Term Evolution or Long Term Evolution Advanced based communication system.

11. An apparatus comprising a processing system configured to:

control reception of information on resources of a common random access channel allocated to a plurality of local area base stations; wherein, for each of the local area base stations, the allocated resources include preambles of the common random access channel, and utilize the resources when controlling transmission of the preambles of the common random access channel;

wherein the preambles are at an occasion in time, the preambles at the occasion in time are allocated in preamble groups to two or more base station groups, each preamble group comprises a predetermined number of contention free preambles and contention based preambles, and the apparatus is associated with a base station in one of the two or more base station groups.

12. The apparatus of claim 11, the processing system being further configured to at least one of:

control the reception of dedicated signaling comprising the information;

control the reception of one or more broadcast messages comprising the information; or control the reception of System Information Block Transmissions comprising the information.

13. The apparatus of claim 11, the processing system being further configured to control the reception of a parameter value indicating an amount of contention free random access preambles.

14. The apparatus of claim 11, the processing system being further configured to at least one of:

cause the sending of a random access preamble to a base station on the common random access channel;

control the reception of a Random Access Response from the base station, the response corresponding to a sent preamble; or receive one random access channel configuration that covers more than one local area base station.

15. The apparatus of claim 11, wherein at least one of:
the apparatus is a user equipment; or
the apparatus is a mobile device.

16. A method in a communication system, the method comprising:

controlling one or more local area base stations, by a macro base station;

dividing occasions in time of a common random access channel for different local area base station groups, such that each occasion in time is allocated to two or more of the local area base station groups, and wherein each local area base station group comprises one or more local area base stations; and allocating resources of the common random access channel between the local area base stations, the resources comprising preambles, wherein allocating the resources of the common random access channel includes, for said each occasion in time, allocating a preamble group for each local area base station in the local area base station groups to which the occasion in time is allocated;

wherein each preamble group comprises a predetermined number of contention free preambles and contention based preambles.

17. The method of claim 16, further comprising at least one of:

informing user equipment about the allocation of the resources using dedicated signaling;

informing user equipment about the allocation of the resources using one or more broadcast messages;

informing user equipment about the allocation of the resources using System Information Block transmissions;

informing user equipment about an amount of contention free random access preambles with one parameter value;

causing the sending of a Random Access Response that corresponds to the random access channel; or causing one random access channel configuration that covers more than one local area base station to be sent to user equipment.

18. The method of claim 16, wherein at least one of:

indexes of the contention free random access preambles for a given local area base station are located after the contention based random access preamble indexes of the given local area base station;

indexes of the contention free random access preambles at the occasion in time are located after the contention based random access preambles at the occasion in time;

the indexes of the contention free random access preambles at the occasion in time are allocated in the same order as the indexes of the corresponding contention based random access preambles at the occasion in time; or the contention free random access preambles are located in a contention free preamble space of legacy user equipment.

* * * * *